United States Patent [19]
Yanko et al.

[11] Patent Number: 5,464,198
[45] Date of Patent: Nov. 7, 1995

[54] TORSIONAL VIBRATION DAMPER HAVING HELICAL TORSION SPRINGS

[75] Inventors: John P. Yanko, Shelby Township; David A. Hall, Clawson, both of Mich.

[73] Assignee: Borg-Warner Automotive, Inc., Sterling Heights, Mich.

[21] Appl. No.: 379,000

[22] Filed: Jan. 27, 1995

Related U.S. Application Data

[63] Continuation of Ser. No. 728,181, Jul. 10, 1991, abandoned, which is a continuation-in-part of Ser. No. 131,861, Dec. 11, 1987, abandoned.

[51] Int. Cl.⁶ ................................................. F16F 1/06
[52] U.S. Cl. ................................... 267/167; 267/179
[58] Field of Search ................... 267/166, 167, 267/170, 179, 286, 290, 168, 174, 180; 192/106.2; 464/68; 280/696, 701, 702

[56] References Cited

U.S. PATENT DOCUMENTS

| | | | |
|---|---|---|---|
| 1,429,690 | 9/1922 | O'Connor | 29/173 |
| 1,523,225 | 1/1925 | Lukens | 267/166 |
| 1,878,128 | 9/1932 | Griswold | 267/286 |
| 2,026,007 | 12/1935 | White | 267/61 |
| 2,260,606 | 10/1941 | Clark | 267/61 |
| 2,278,324 | 3/1942 | Kollmann | 287/75 |
| 2,351,726 | 6/1944 | Wallace | 267/61 |
| 2,695,169 | 11/1954 | Keysor | 267/60 |
| 2,998,242 | 8/1961 | Schwarzbeck et al. | 267/61 |
| 3,058,705 | 10/1962 | Hagg et al. | 248/20 |
| 3,061,054 | 10/1962 | Simmonds | 189/34 |
| 3,456,684 | 7/1969 | Sochting | 137/543.17 |
| 3,589,226 | 5/1971 | Shadowens | 83/143 |
| 4,017,062 | 4/1977 | Szirner | 267/166 |
| 4,148,469 | 4/1979 | Geyer | 267/168 X |
| 4,304,107 | 12/1981 | Fall et al. | 74/27 C |
| 4,360,352 | 11/1982 | Lamarche | 464/64 |
| 4,377,280 | 3/1983 | Wienand et al. | 267/180 |
| 4,402,205 | 9/1983 | Yakovlev | 72/138 |
| 4,441,696 | 4/1984 | Buzinski | 266/57 |
| 4,555,009 | 11/1985 | Habel et al. | 192/106.2 |
| 4,648,423 | 3/1987 | Henken | 137/494 |
| 4,672,549 | 6/1987 | Saxton | 364/468 |
| 4,810,231 | 3/1989 | Weissenberger et al. | 192/106.2 X |

FOREIGN PATENT DOCUMENTS

| | | | |
|---|---|---|---|
| 857405 | 9/1940 | France | 252/168 |
| 1507552 | 12/1967 | France . | |
| 2495256 | 4/1982 | France . | |
| 8530850 | 12/1985 | Germany . | |
| 777736 | 6/1957 | United Kingdom . | |
| 1185924 | 3/1970 | United Kingdom . | |

Primary Examiner—Robert J. Oberleitner
Assistant Examiner—Lee W. Young
Attorney, Agent, or Firm—Willian, Brinks, Hofer, Gilson & Lione; Greg Dziegielewski

[57] ABSTRACT

A torsional vibration damper (1) has an input assembly (2,6,7) and a reactor plate (25) with coil springs (40) circumferentially spaced about a center axis of the damper to absorb vibration between the input assembly and reactor plate. Each coil spring (40) includes a plurality of active coils (50) and partial end coils (44). The active coils have a pitch greater than the diameter (d) of the wire (11) and the partial end coils have a pitch equal to the diameter of the wire. A flattened arcuate surface (42) is formed on the partial end coil which spans less than a full coil turn. A distal tip (46) of the end coil has a thickness that is a fraction of the diameter of the wire that is inversely proportional to the amount of arcuate flattened surface of the end coil section. The gap (66) between the tip and the adjacent coil is also inversely proportional to the amount of arcuate spanning surface of the end coil section.

18 Claims, 4 Drawing Sheets

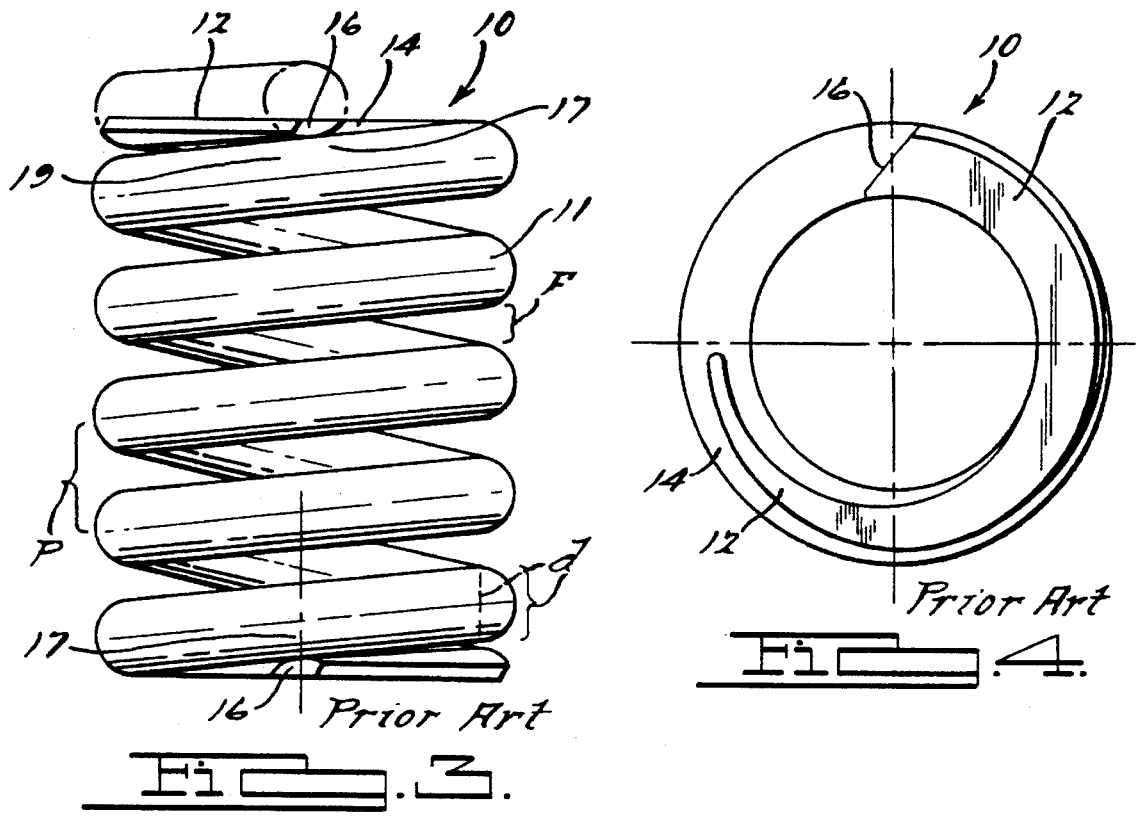
Fig. 3. *Prior Art*
Fig. 4. *Prior Art*
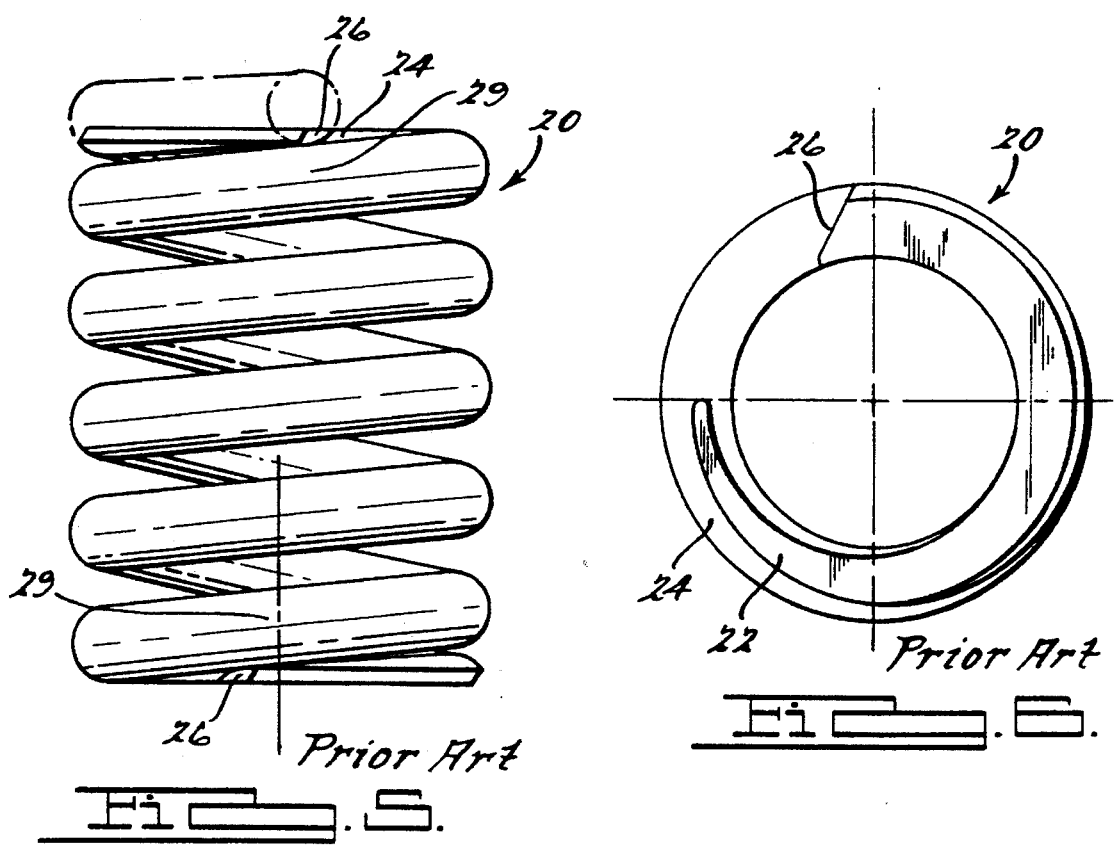
Fig. 5. *Prior Art*
Fig. 6. *Prior Art*

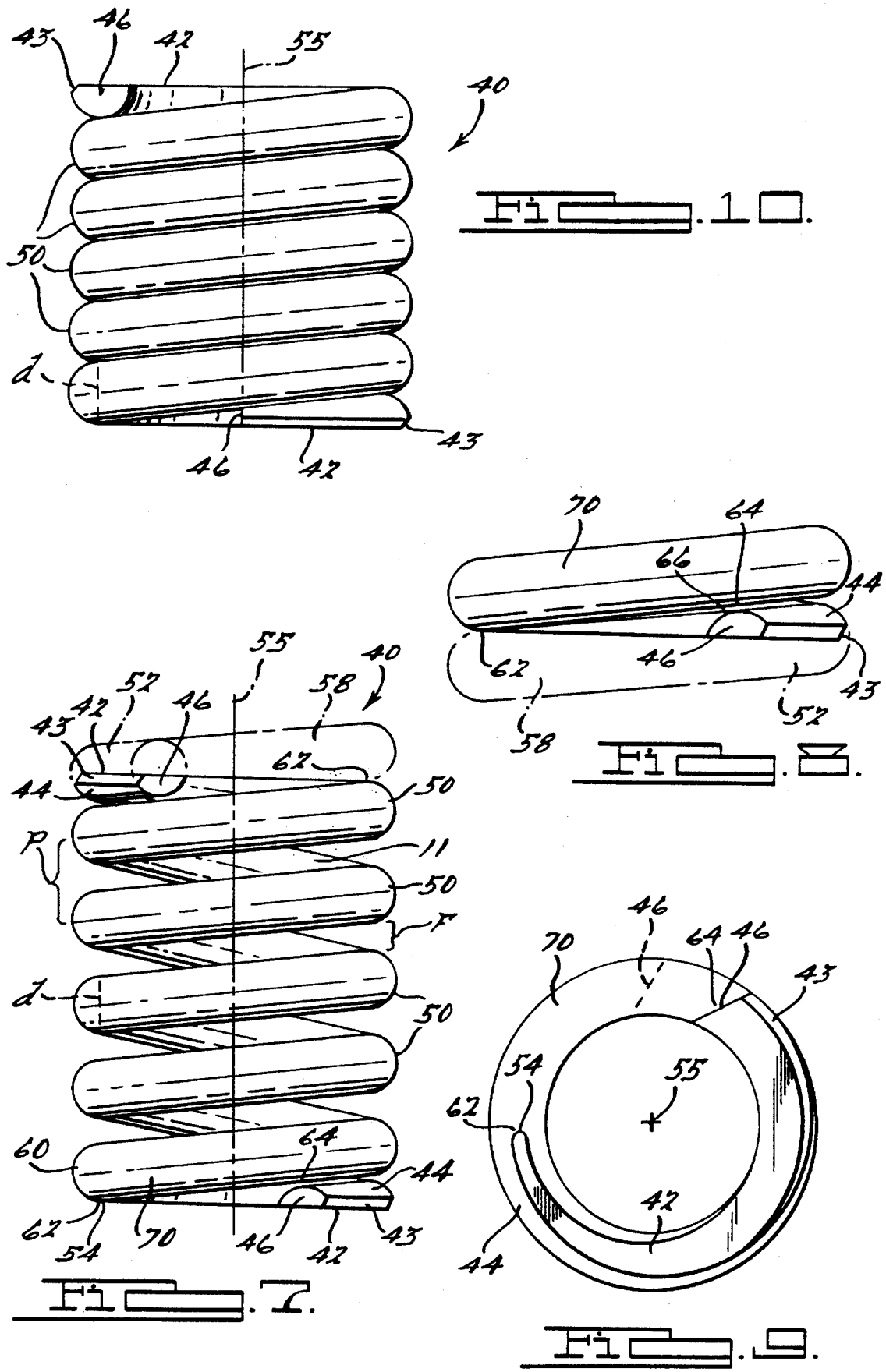

5,464,198

TORSIONAL VIBRATION DAMPER HAVING HELICAL TORSION SPRINGS

This application is a continuation of application Ser. No. 07/728,181, filed Jul. 10, 1991, now abandoned, which is a continuation-in-part of application Ser. No. 131,861 filed Dec. 11, 1987, now abandoned.

TECHNICAL FIELD

This invention relates to improvements in automotive torsional vibration dampers and more particularly to an improved helical torsion spring for use in a torsional vibration damper.

BACKGROUND OF THE INVENTION

The use of a torsional vibration damper conventionally has been an accepted way to absorb undesirable torsional vibrations from the vehicle engine or transmission input during operation of a motor vehicle. Initially, vibration dampers have been designed with springs in parallel and in series with a capacity to absorb torsional shock or vibration emanating from an engine or transmission input without the spring in the vibration damper being fully compressed to its solid height. However, as engines became more efficient and more powerful, the vibration dampers had to absorb increased torsional loads and the springs in the vibration dampers compressed to a greater extent to absorb the increased loads.

Because many of the springs were not designed to be fully compressed, many of these torsional vibration dampers would have a stop limit built in. However, the stop limit adds extra complexity to the torsional vibration damper and also takes room that can otherwise be used to house more shock absorbing springs.

Due to packaging constraints, the torsional vibration dampers increased capacity must be achieved without an increase in size. Hence, what is needed is a torsional vibration damper that has its springs designed to be durable and to be fully compressed thereby maximizing the capacity for vibration absorption and eliminating the necessity for a separate limit stop built into the torsional vibration damper.

A spring has been defined as a machine element for storing energy as a function of displacement. Force applied to a spring member causes it to deflect through a certain displacement thus absorbing energy. A spring may have any shape and may be formed from any elastic material. In particular, coil springs are commonly utilized in damping arrangements in clutch plates and torsional dampers.

The springs in the damper provide vibration control by reducing stiffness of a drive line. Additional spring wire stressed in torsion lowers the drive line stiffness. Thus, the springs, by lowering the stiffness of the drive line, provide vibration control from impulses or shocks in the driveline of an automotive vehicle between the vehicle engine and the transmission.

A helical spring is formed from a bar or wire, commonly with uniform cross section, which is wound in a helix. Usually, the last turn at each end of the spring is modified to have a planar end surface lying in a plane perpendicular to the helix axis, and force can then be applied to the bearing surfaces of the end coils to place the helix in compression. Springs may be classified into several varieties with the variation in the end coil providing the difference. A plain end for a coil spring has a constant pitch for both the active coils and the end coils with the wire cut off generally square to the axis of the wire. The end coils can then be ground square to the spring axis, providing flat bearing surfaces. On the other hand, a closed end spring has the final coil bent so that at least a portion of the end coil is in contact with the adjacent active coil of the spring. In this version also, the end coil can be ground flat to provide a bearing surface for the spring.

Commonly, springs that have been designed to be fully compressed are closed end springs that have their final coil having a pitch equal to the thickness of the wire such that non-torsional bending forces are minimized on each coil. In grinding this end coil, a compromise must be made with respect to the arcuate extent of the coil which is ground perpendicular to the axis of the spring. A full 360° grind has been impractical. If the full 360° of the end coil were to be ground, the end tip would be extremely thin and would be damaged or broken off by the forces exerted during the use of the spring. As a lesser arcuate sector of the end coil is ground, a greater tip thickness is produced, however, the seating area of the spring is also reduced and the increased thickness of the tip produces heavy loading on the first active coil when the spring is fully compressed. These conflicting limitations result in a very narrow range of acceptability of grinding and are difficult to meet in production.

SUMMARY OF THE INVENTION

In accordance with one aspect of the invention, a torsional vibration damper for automotive vehicles has a torque input member such as a clutch plate or fly wheel coaxially mounted to an output element such as a driven hub. The hub and input member are pivotably mounted relative to each other for a limited amount. The torque input member and hub also form a plurality of cages for mounting a plurality of helical springs in parallel in series or in a combination of springs both of parallel and in series about the center axis of the torsional vibration damper. One or more helical spring is mounted in each cage designed to be completely compressed within the cage to a solid height. As the input member pivotably moves with respect to the output hub, the seating surfaces of the respective input and output members compress the helical spring members such that shocks and vibrations are absorbed by the spring members.

Each helical coil spring has a distal tip end of sufficient thickness to withstand impacts imposed during use and yet provide an adequate seating area. A coil spring formed in accordance with the present invention has an end bent to provide a pitch equal to the thickness of the spring material. The end section of this reduced pitch relative to the active coils extends through an arc of less than 360°, unlike the prior art in which the reduced pitch end section extended for a full turn. This results in a gap between the distal tip end and the adjacent active coil when the spring is unloaded. In a preferred embodiment of the invention, which will subsequently be described in detail, the gap is a predetermined fraction of the deflection per coil of the spring. The fraction is linearly, inversely proportional to the seating area of the spring which is flattened by grinding. The spring distal tip has a thickness which is the above identified fraction of the thickness of the spring wire. For a spring wire having a circular cross-section, the thickness of the wire is the diameter of the wire.

This arrangement results in a helical coil spring with an adequate seating area to avoid offsetting forces on the spring during deflection and with a tip thickness adequate to withstand the forces imposed during use.

BRIEF DESCRIPTION OF THE DRAWINGS

Reference now is made to the accompanying drawings in which:

FIG. 3 is a side-elevational view of a coiled spring found in the prior art;

FIG. 4 is an end view of the spring shown in FIG. 3;

FIG. 5 is a side elevational view of another spring in the prior art;

FIG. 6 is an end view of the coil spring shown in FIG. 5;

FIG. 7 is a side-elevational view of the coil spring member shown in FIG. 1;

FIG. 8 is an enlarged and fragmentary side-elevational view of the spring shown in FIG. 7 illustrating the end coil;

FIG. 9 is an end view of the coil spring shown in FIG. 7;

FIG. 10 is a side-elevational view of the spring shown in FIG. 7 at a full solid compressed condition;

DETAILED DESCRIPTION OF THE PREFERRED EMBODIMENT

Figure 1:
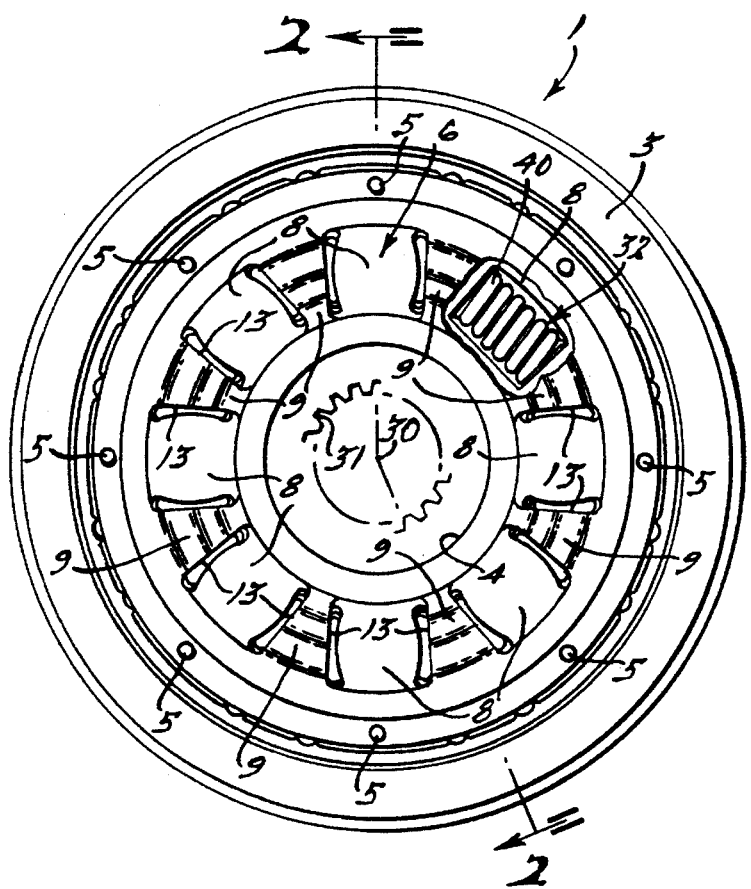
FIG. 1 is a front elevational partially segmented view of a lock-up clutch torsional vibration damper for a torque converter illustrating one embodiment of the invention.
Figure 2:
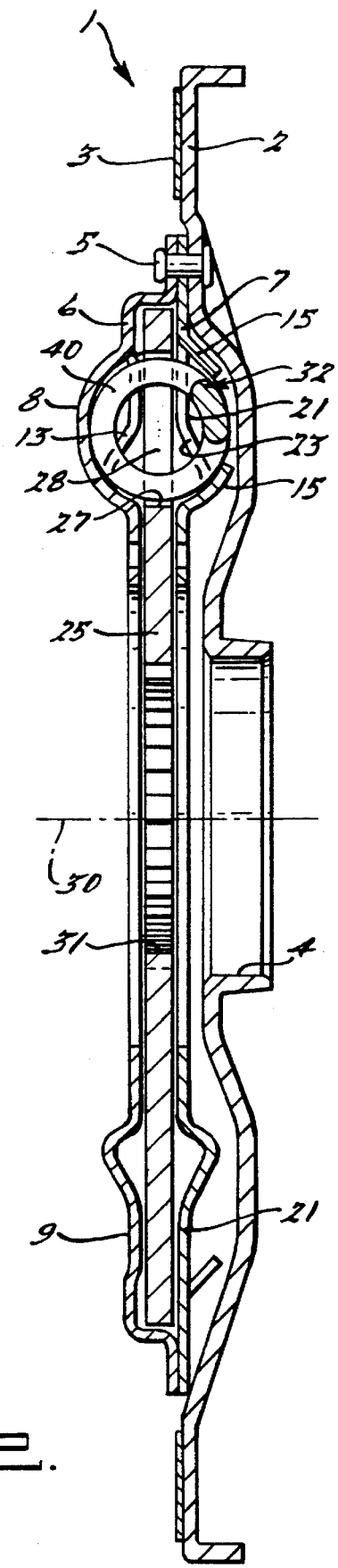
FIG. 2 is a cross-sectional view taken along lines 2—2 shown in FIG. 1.

Referring now to FIGS. 1 and 2, the vibration damper assembly 1 is secured to a torque input member such as a clutch plate 2 that carries friction linings 3 and has a central opening 4. A plurality of rivets 5 secure the torque input member 2 to a pair of spring retainer plates 6 and 7. Plate 6 has a plurality of arcuate embossed sections 8 contoured to receive a laterally disposed spring. Interspersed between the arcuate embossed sections 8 are drive straps 9 that have edges 13 forming spring seats.

Spring retainer plate 7 has spring retaining lips 15 positioned to be opposite the arcuate embossed sections 8 interspersed with driving straps 21 that have edge 23 forming spring seats.

A reactor plate 25 is rotatably mounted between the spring retaining plates 6 and 7. The reactor plate 25 has a plurality of slots 27 that are normally aligned with the arcuate embossed sections 8 and lips 15. Each edge 28 of slots 27 also forms a spring seat. The center opening 31 is splined to be attached to an output drive shaft.

A plurality of coil springs 40 are positioned within the spring cage 32 defined by the embossed arcuate section 8, slots 27 and lips 15. The cages 32 are circumferentially spaced about the coaxial center of the torsional vibration damper 1. The springs 40 are placed in parallel relationship with each other with each spring having its end sections seated against edge 28 and/or edge 23.

Referring now to FIGS. 3–6, typical prior art springs that have been placed in cages 32. Referring particularly to FIGS. 3 and 4, a closed coil spring has a minimal amount of flattened surface 12 at its end coil 14 and consequently a distal tip 16 with maximum allowable thickness. A spring having a thicker tip would be unacceptable due to bending stresses that would be excessively high in a region 17 where the distal tip 16 abuts the adjacent active coil 19 when the spring is compressed to its solid height. The end coil extends for 360° and has a pitch that is equal to the diameter of the wire 11 so that the tip 16 contacts the adjacent active coil 19 even when the spring is unstressed.

Another spring is shown in FIGS. 5 and 6 with an end coil 24 having a flattened surface 22 that extends a greater arcuate extent than the flattened surface 12 of the spring shown in FIGS. 3 and 4. Consequently, the tip 26 is thinner. This tip has a minimum acceptable thickness. If the tip were thinner it would be too fragile and might break under load. The arcuate extent of the flatten surface 12 of the spring of FIGS. 3 and 4 and the flattened surface 22 of the spring of FIGS. 5 and 6 only differ by a few degrees and in production it is very difficult to produce springs falling between these narrow limits.

A coil spring 40, as shown in FIGS. 1 and 2, is illustrated in detail in FIGS. 7, 8, 9 and 10. The spring 40 is made from wire 11 of diameter (d) with a plurality of active coils 50 each having a pitch P which is greater than the diameter (d) of the wire. As a consequence, each of the active coils has a deflection per coil, i.e., a gap between active coils which is labeled F.

The arcuate flat surface 42 which is formed by grinding away coil section 52 is shown in FIG. 7. The surface 42 is substantially perpendicular to the longitudinal axis 55 of spring 40. The end coil 44 and the flat surface 42 terminate at distal tip 46. Unlike the prior art springs, the end coil 44, measured from the point 62 at which the pitch first substantially equals the diameter (d) of the wire, to the distal tip 46, extends for less than 360°. The ground flattened surface 42, from point 54 to distal tip 46, likewise extends for less than 360°, and extends fully within the end coil section which has pitch (d). If a full coil turn were to be projected as shown by phantom section 58, the tip at the end of a full end coil would then abut the beginning of the end coil at contact point 62. In other words, the partial end coil 44 is projectedly closed. However, the tip 46 terminates before the section 58 abuts at point 62 such that a gap 66 as shown in more detail in FIG. 8 exists between tip 46 and adjacent coil portion 64. The axial position of end surface 42 is aligned with projected contact point 62.

The arcuate flattened end coil 44 is less than one coil turn. The flattened end coil section 44 spans between 170° and 300°. Desirably, the flattened end coil can be between 190° and 270°. In one application, the arcuate span is approximately 247°. It follows that the tip thickness is preferably at least 25% of the wire diameter. The surface 42 is substantially perpendicular to central axis 55.

The tip thickness is related to the arc of the flattened surface. The tip thickness substantially equals $$\left[ 1 - \frac{\text{arcuate flattened surface}°}{360°} \right] \times \text{wire diameter } (d)$$

The term $$\frac{\text{arcuate flattened surface}°}{360°}$$

can be referred to as a fraction (f). The phrase "arcuate flattened surface °" can also be referred to as the grind in degrees. If the transition coil section 70 has an average pitch significantly different than the active coil, the gap is measured $[1 - f] \times$ the averaged deflection per coilturn for the transition coil section The gap 66 between the tip 46 and point 64 depends on the pitch of transition section 70 from the starting point 54 of the flattened arcuate section to point 64 adjacent the tip 46. If the section 70 has a pitch equal to the pitch (P) of the remaining active coils such that the pitch changes at point 54 the gap measures:

$(1-f) \times$ deflection of the active coils $(F)$

The two tips 46 at the bottom and the top end coils are axially positioned such that they do not complete a full coil turn, i.e., they do not overlap in the axial direction. The total number of coils, i.e., the number of active coils, end coils and transition coil sections add up to slightly less than a whole integer, i.e., preferably less than a whole integer by an amount less than ¼. In one embodiment, the amount should be approximately 1/10 less than a whole integer.

When manufacturing tolerances are taken into account to determine the minimum acceptable gap and minimum acceptable tip thickness, the maximum allowable arcuate flattened surface, the minimum allowable deflection per coil (F) and the minimum allowable wire diameter (d) should be used in the above calculations.

When the spring 40 is compressed to solid height as shown in FIG. 10, the active coils and end coils nest against each other with minimum amount of localized stresses and non-torsional bending of the coils.

It has been determined and tested that springs according to this construction used in a torsion spring damper have significant increased durability and reliability, even when the torsion spring damper fully compresses the spring between seats 13, 23 and 28 within cages 32.

In manufacturing, each spring 40 is coiled on a conventional spring coiling machine with the wire being cut off and bent short of contacting the next adjacent coil. On removal from the coiling machine, the spring is stressed relieved, the ends are ground off, to provide a bearing surface and the ends are chamfered as shown in FIGS. 7–10 at section 43. The springs for some applications are shot peened to improve durability.

While the torsional vibration damper 1 shown in FIG. 1 shows a single spring 40 in each cage 32 with the springs 40 all being parallel, other spring arrangements may be desirable for certain applications.

The torsional vibration damper may seat two springs in parallel with each other in each cage 32. The springs may be coaxially mounted with one nested inside another. Each spring has end coil sections as above described.

Figure 11:
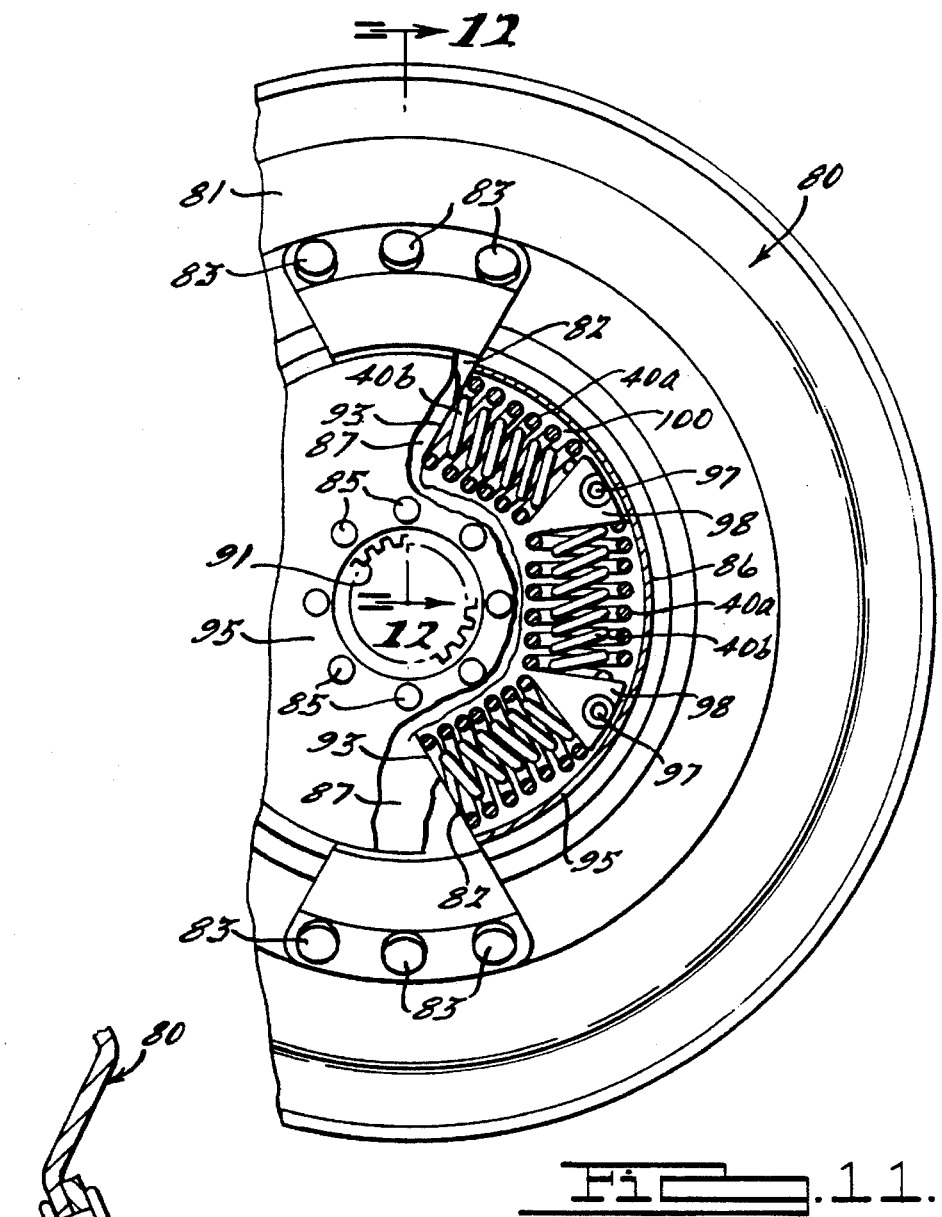
FIG. 11 is a fragmentary front elevational and partially segmented view of another torsional vibration damper.
Figure 12:
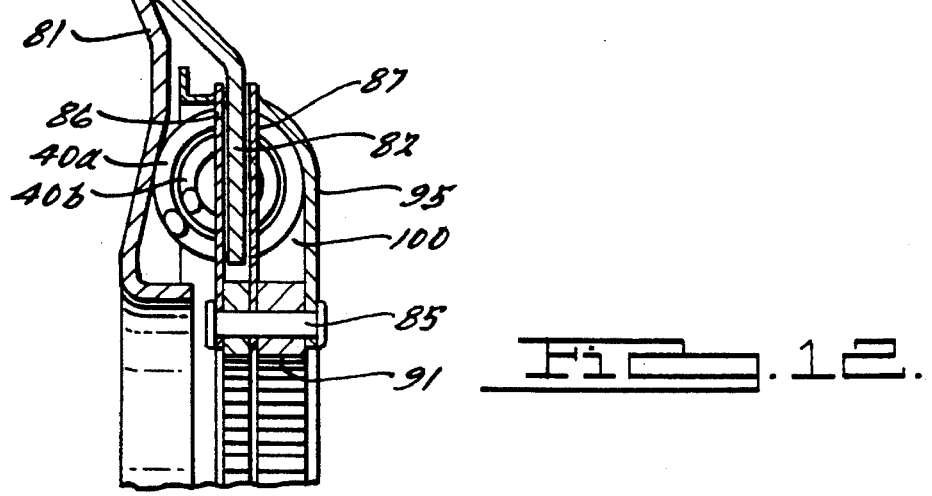
FIG. 12 is a fragmentary cross-sectional view taken along line 12—12 shown in FIG. 11.

Referring now to FIGS. 11 and 12, another torsional vibration damper 80 is shown using spring 40a and 40b. Springs 40a and 40b have end coil sections constructed in the same fashion as spring 40 described above. Three springs 40a forming a spring set are connected in series between the seat 82 fixed to the input member 81 by rivets 83 and seat 93 of reactive members 86 and 87. Three springs 40b nested in springs 40a are also connected in series in the same fashion. Reactive members 86 and 87 are assembled by rivets 85 to an output hub 91. A spring retaining shell 95 is fixed to reactive member 87.

A pair of floating spring seats 98 are slidably movable in the spring cage 100 defined between input member 80 and shell 95. The seats 98 can have bearings 97 rolling against shell 95. The floating seats 98 are interposed between two end coil sections of two adjacent springs 40a and two adjacent springs 40b.

Identical sets of springs 40a and 40b are positioned between seats 93 and 82 on the left side of torsional vibration damper. For simplicity of the drawing, these springs are not shown in FIG. 11.

The two spring sets formed by springs 40a are in parallel to each other. The two spring sets formed by springs 40b are also in parallel with each other. Furthermore, the spring sets formed by springs 40a are in parallel to the spring sets formed by springs 40b. Thus, torsional vibration damper 80 has a combination of springs both in series and in parallel.

Other variations and modifications of the present invention are possible without departing from its scope and spirit as defined in the appended claims.

The embodiments in which an exclusive property or privilege as claimed are defined as follows:

1. An open coil spring for use in a torsional vibration damper for absorbing torsional vibrations from a vehicle engine or transmission input during operation of a motor vehicle, the open coil spring comprising:
 a plurality of active coils having a pitch greater than the thickness of wire forming the active coils; and
 opposing end coil sections, each end coil section having a pitch substantially equal to the diameter of the wire and having an arcuate flattened end surface terminating in a distal tip such that the distal tip of the end coil section is axially spaced from an active coil adjacent thereto to form a gap therebetween, the arcuate flattened end surface formed substantially perpendicular to a longitudinal axis of the open coil spring and spanning between 190 and 270 degrees and the opposing distal tips axially positioned such that when superimposed they do not complete a full coil turn.

2. The open coil spring of claim 1 wherein the gap is approximately equal to $$\left[ 1 - \frac{\text{arcuate flattened surface}°}{360°} \right] \times \text{deflection } (F) \text{ per coil.}$$

3. The open coil spring of claim 2 wherein the distal tip has a thickness approximately equal to $$\left[ 1 - \frac{\text{arcuate flattened surface}°}{360°} \right] \times \text{wire thickness } (d).$$

4. The open coil spring of claim 3 wherein the gap is a fraction of the average deflection per coil of a transition section and is inversely linearly proportional to the arcuate span of the arcuate flattened surface over a full 360 degree turn, the distal tip having a thickness that is inversely linearly proportional to the arcuate span of the arcuate flattened surface over a full 360 degree turn.

5. The open coil spring of claim 3 wherein the gap must be greater than $$\left[ 1 - \frac{\text{maximum allowable arcuate flattened surface}°}{360°} \right] \times$$

minimum allowable deflection $(F)$ per coil, and the tip thickness must be greater than $$\frac{[1 - \text{maximum allowable arcuate flattened surface}°]}{360°} \times$$

-continued minimum wire diameter $(d)$.

6. The open coil spring of claim 5 wherein the end coil sections and the active coils add up to a total number of coils less than a whole integer by an amount less than ¼.

7. The open coil spring of claim 6 wherein the end coil sections and the active coils add up to a total number of coils less than a whole integer by an amount approximately equal to 1/10.

8. The open coil spring of claim 7 further comprising a transition section adjacent the active coil and the end coil section where the pitch changes from pitch greater than the diameter of the wire to a pitch equal to the diameter of the wire, the transition section spanning approximately ¼ of a coil turn.

9. An open coil spring for use in a torsional vibration damper for absorbing torsional vibrations from a vehicle engine or transmission input during operation of a motor vehicle, the open coil spring comprising:

a plurality of active coils having a pitch greater than the thickness of wire forming the active coils; and opposing end coil sections extending for less than a full 360 degree turn, each end coil section having a pitch substantially equal to the diameter of the wire and having an arcuate flattened end surface terminating in a distal tip such that a distal tip of the end coil section is axially spaced from an active coil adjacent thereto to form a gap therebetween, the arcuate flattened end surface formed substantially perpendicular to a longitudinal axis of the open coil spring and spanning between 190 and 270 degrees and the opposing distal tips having a thickness at least one quarter (¼) of the diameter of the wire and axially positioned such that when superimposed they do not complete a full coil turn and wherein the end coil sections and the active coils add up to a total number of coils less than a whole integer by an amount less than ¼.

10. A torsional vibration damper for absorbing torsional vibrations from a vehicle engine or transmission input during operation of a motor vehicle, the torsional vibration damper comprising:

a torque input member;

a reaction output member;

the torque input member and the reaction output member having spring seats and forming a plurality of spring retainer cages, the cages being circumferentially spaced about a central axis of the torsional vibration damper;

a coil spring seated in each cage capable of being fully compressed to maximize the capacity for absorbing torsional vibrations from the vehicle engine or transmission input, the coil spring including a plurality of active coils having a pitch greater than the diameter of wire forming the active coils; and opposing end coil sections, each end coil section having a pitch substantially equal to the diameter of the wire and having an arcuate flattened end surface terminating in a distal tip such that the distal tip of the end coil section is axially spaced from an active coil adjacent thereto to form a gap therebetween, the arcuate flattened end surface formed substantially perpendicular to a longitudinal axis of the coil spring and spanning between 190 and 270 degrees and the opposing distal tips axially positioned such that when superimposed they do not complete a full coil turn.

11. The torsional vibration damper of claim 10 wherein the distal tip has a thickness approximately equal to $$\left[1 - \frac{\text{arcuate flattened surface}°}{360°}\right] \times \text{wire diameter } (d).$$

12. The torsional vibration damper of claim 11 wherein the arcuate flattened surface is approximately equal to 247 degrees.

13. The torsional vibration damper of claim 10 wherein the gap between the distal tip and the adjacent active coil is approximately equal to $$\left[1 - \frac{\text{arcuate flattened surface}°}{360°}\right] \times \frac{\text{deflection of the}}{\text{active coils } (f)}$$

14. The torsional vibration damper of claim 13 wherein the end coil sections and the active coils add up to a total number of coils less than a whole integer by an amount approximately equal to 1/10.

15. The torsional vibration damper of claim 13 wherein the end coil sections and the active coils add up to a total number of coils less than a whole integer by an amount less than ¼.

16. The torsional vibration damper of claim 15 wherein each coil spring is mounted in parallel with respect to each other with each spring having one axial end coil section abutting a spring seat of the input member and a second axial end coil section abutting a spring seat of the reaction output member.

17. The torsional vibration damper of claim 15 wherein at least two coil springs are mounted in series with respect to each other with one axial end coil section of at least two coil springs seated against a floating seat member interposed therebetween.

18. The torsional vibration damper of claim 15 wherein the coil springs are mounted in a combination of series and parallel assemblies with respect to each other;

the coil spring assemblies that are mounted in series having a floating seat member interposed between two springs, with one axial end coil section of each spring abutting the floating seat member;

the coil spring assemblies that are mounted in parallel with each other having one axial end coil section seated against a spring seat of the input member and a second axial end coil section seated against a spring seat of the reaction output member.

* * * * *